Patented Nov. 13, 1934

1,980,972

UNITED STATES PATENT OFFICE 1,980,972

MORPHINE DERIVATIVE AND PROCESSES FOR ITS PREPARATION

Lyndon Frederick Small, Charlottesville, Va., assignor to Government of the United States, represented by the Secretary of the Treasury No Drawing. Application July 19, 1934, Serial No. 736,108

7 Claims. (Cl. 260—25)

(Granted under the act of March 3, 1883, as amended April 30, 1928; 370 O. G. 757)

The invention described herein may be manufactured and used by or for the Government of the United States for governmental purposes only without the payment to me of any royalty thereon.

The present invention is a new product of the morphine series and is superior in physiological action to most present known narcotics related to morphine, codeine and drugs of like action and which may serve to replace morphine, in pharmaceutical preparations and in medical applications.

The invention is more effective in producing analgesia, in effect on respiration and cough, and in general depressant action, but relatively free from convulsant, emetic and toxic effects, and is designed to replace morphine and other drugs of morphine-like action in therapeutic practice. It is intended to be administered by mouth, by rectum or by injection. In respect to effective dose it will be less costly—that is, the amount necessary for an effective dose would be less than morphine or codeine; consequently for an effective dose it would be less expensive than the equivalent amount of morphine or codeine.

The methods of producing the present product are simple in operation and relatively economical.

The invention, to be known chemically as dihydrodesoxy-morphine-D, represents a dihydrogenated morphine in which the alcoholic hydroxyl group has been replaced by a hydrogen atom.

The present product may be attained in three distinct ways: (1) by catalytic hydrogenation of the halogenomorphides; (2) by catalytic hydrogenation of the halogenocodides, followed by demethylation; (3) by catalytic hydrogenation of desoxy-morphine-C (see Journal of American Chemical Society, vol. 55, page 2874 of 1933, particularly at page 2881) under special conditions.

The applicant is aware that German Patent #414,598 of Knoll and Company claims the preparation of a substance of the formula of dihydrodesoxymorphine-D. Applicant has, however, demonstrated that the product in the Knoll patent is actually a desoxymorphine which depresses the melting point of dihydrodesoxymorphine-D and is convertible to the latter by addition of two hydrogen atoms catalytically, and therefore can not be identical with it.

In producing the product of the invention by the first example mentioned above: Fifteen grams of alpha-chloromorphide, a well-known morphine derivative, dissolved in 150 cc. of absolute methanol is shaken in the presence of 1 gram of palladium on barium sulphate in an atmosphere of hydrogen, whereby about 2064 cc. of hydrogen, more or less, is absorbed. The solution is then filtered and the solvent removed by distillation at atmospheric pressure, or preferably in vacuum at about 40° C. The resulting material is dissolved in water and the product precipitated out by slow addition of ammonia, sodiumcarbonate, or similar precipitants for phenolic substances, shaking into ether or other organic solvent, as chloroform, benzene, etc., after each addition. The organic solvent is distilled to a small volume and traces of tetrahydrodesoxymorphine filtered out. The product remaining in the solvent crystallizes on rubbing with ethyl acetate. The yield is approximately 9.2 grams. The substance has the melting point 188–189° C. and has the specific rotation in absolute methanol $$[\alpha]_D^{28} -76.8° (c=1.614).$$

Analysis shows the composition to be $C_{17}H_{21}O_2N$.

As variations of this process, under the first example the well-known beta-chloromorphide, bromomorphide or iodomorphide may be used, and other noble metal catalysts or copper containing catalysts, or finely divided nickel in various organic solvents as ethanol, benzene, etc., or in acid solutions, may be employed as well as the neutral aqueous solution of the salts, or alkaline solution, but in a degree less satisfactory so far as experiments have shown, the neutral salts being more satisfactory than the alkaline solution.

The amounts of catalysts and solvent, above mentioned, may be varied within wide limits without greatly changing the result. Also, hydrogen pressure below and especially above, atmospheric pressure may be employed.

The product may likewise be isolated advantageously in the form of salts, as oxalate, salicylate, hydrochloride, sulfate, etc. Dihydrodesoxymorphine-D hydrochloride of formula $$C_{17}H_{21}O_2N.HCl$$

has the specific rotation $$[\alpha]_D^{27} -66.8° (\text{water}, c=0.898).$$

Dihydrodesoxymorphine-D sulfate of formula $(C_{17}H_{21}O_2N)_2H_2SO_4+2H_2O$, has the specific rotation $$[\alpha]_D^{29} -57.9° (\text{water}, c=1.425).$$

These salts as well as numerous others such as the tartrate, phosphate and acetate are soluble in water and adapted to medical use.

In preparing the dihydrodesoxymorphine-D in accordance with the second example: Fifty grams of the well-known codeine derivative, alpha-chlorocodide, is dissolved in 160 cc. of dilute, preferably normal hydrochloric acid, 100 cc. of water and 2 grams of palladium on barium sulfate catalyst added, and the mixture shaken under hydrogen until absorption ceases. The amounts of these reagents and the strength of acid may be varied within wide limits without greatly changing the result. About 7600 cc. of hydrogen is absorbed. The product of this hydrogenation, the known dihydrodesoxycodeine-D, is isolated after removal of the catalyst by treating the acid solution with excess of sodium carbonate, sodium hydroxide or other alkaline agents and extracting into ether or other organic solvents usually employed for extraction. The product is obtained in nearly quantitative yield when the organic solvent is distilled off, and is purified by crystallization from alcohol, acetone, benzene or other solvents, or may be purified advantageously as salts such as the tartrate, salicylate, sulfate and others. As variations of this process, other known halogenocodides, as beta-chlorocodide, bromocodide or iodocodide may be used in organic solutions or in acid solutions, and alpha-chlorocodide may be used in organic solvents as ethanol, methanol, and others adapted as media for hydrogenation. Other catalysts, as the various known active forms of platinum, palladium, and nickel, and copper compounds may be employed. The dihydrodesoxycodeine-D is demethylated as follows: Ten grams of dihydrodesoxycodeine-D is dissolved in 50 cc. of hydrobromic acid (48% HBr, sp. gr. 1.49) and boiled under a reflux condenser until the product is completely soluble in sodium hydroxide solution, requiring about 15 minutes. The reaction mixture is diluted with water, 500 cc. of ether, benzene, chloroform, etc., added and saturated sodium carbonate solution or ammonia in excess cautiously poured in. The precipitate of dihydrodesoxymorphine-D is extracted into the organic layer. Several more extractions yield a small additional amount of the drug. During the extraction, traces of tetrahydrodesoxymorphine, which is almost insoluble in organic solvents, are separated by filtration and discarded. The yield is about 8 grams of pure dihydrodesoxymorphine-D base. As variations of this demethylation, concentrated hydriodic acid may be used, or concentrated hydrochloric acid in a sealed tube at temperatures above 100° C. The amount and strength of the acids used for demethylation may be varied. The product may also be isolated as the crystalline hydrobromide or hydriodide salt when the acid solution is diluted.

In accordance with the third example mentioned above, of preparing the dihydrodesoxymorphine-D: A suspension of 2.27 grams of the well-known desoxymorphine-C hydrochloride (see Journal of American Chemical Society, vol. 55, page 2874 of 1933, particularly at page 2881) in 10 cc. of glacial acetic acid with 0.05 g. of platinum oxide or other platinum, palladium, nickel or copper containing catalyst is shaken under hydrogen until absorption ceases, the solution is freed from catalyst, diluted and treated with excess of ammonia, or sodium carbonate or bicarbonate or similar precipitants for phenolic substances. While the preferred quantities are here stated, the amounts of glacial acetic acid and catalyst may be varied within wide limits. The precipitate is extracted into ether or other organic solvent as benzene or chloroform, and on distillation of the solvent, about 2.2 grams of oily material is obtained. This is rubbed with a little acetone, ethyl acetate or other organic solvent whereby the tetrahydrodesoxymorphine present crystallizes and can be filtered out. The mother liquor yields about 0.75 gram of dihydrodesoxymorphine-D which is purified by one of the methods described in connection with the first example.

As a variation of this process, the well known desoxycodeine-C hydrochloride (see Journal American Chemical Society, vol. 53, page 2225 of 1931) or other desoxymorphine-C ethers may be hydrogenated, and the product so obtained de-etherified as described under the second example.

I have found that in the preparation of the product of this invention, the first and second examples constitute the more feasible and economical preparative methods while the third process is more difficult and involves considerable losses in material, giving a lower yield of the desired product.

The product of invention has a very great advantage over most narcotics in its extreme stability, so that solutions of its salts may be sterilized by boiling without any deterioration.

What I claim as new is:

1. A dihydromorphine derivative in which the alcoholic hydroxyl group of dihydromorphine has been replaced by hydrogen.

2. A new compound having the formula $C_{17}H_{21}O_2N$ and wherein two hydrogen atoms have been added to the alicyclic unsaturation in morphine and the alcoholic hydroxyl group replaced by a hydrogen atom.

3. The method of preparing a new product of the morphine series which includes catalytically hydrogenating a compound selected from the group consisting of halogenomorphides and desoxymorphine-C, in the liquid phase.

4. The method of preparing a new product of the morphine series which includes catalytically hydrogenating a compound selected from the group consisting of the ethers of the halogenomorphides and of desoxymorphine-C in the liquid phase, and then de-etherifying the hydrogenation products.

5. The method of preparing a new product of the morphine series which includes catalytically hydrogenating solutions of the halogenomorphides in the presence of a catalyst selected from a group consisting of nickel, noble metals and copper-containing hydrogenation catalysts.

6. The method of preparing a new product of the morphine series which includes demethylation of dihydrodesoxycodeine-D by action of a hot concentrated acid selected from the group consisting of hydrobromic, hydriodic, and hydrochloric.

7. The method of preparing a new product of the morphine series which includes catalytic hydrogenation of organic acid solutions of desoxymorphine-C in the presence of a catalyst selected from a group consisting of nickel, noble metals and copper-containing hydrogenation catalysts.

LYNDON FREDERICK SMALL.